(12) United States Patent
Gu et al.

(10) Patent No.: US 8,761,920 B2
(45) Date of Patent: Jun. 24, 2014

(54) AUTOMATIC PROBING, COMPENSATION, AND ADJUSTMENT OF A FLEXIBLE FIXTURE FOR A CNC MACHINE

(75) Inventors: Jie Gu, Clarkston, MI (US); Paula J. Deeds, Ypsilanti, MI (US); Sheri K. Kurgin, Macomb, MI (US); John S. Agapiou, Rochester Hills, MI (US); Michael J. Owen, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 557 days.

(21) Appl. No.: 13/048,992

(22) Filed: Mar. 16, 2011

(65) Prior Publication Data
US 2012/0239181 A1 Sep. 20, 2012

(51) Int. Cl.
*G06F 19/00* (2011.01)
*G06F 17/00* (2006.01)
*B23Q 17/22* (2006.01)
*G05B 19/408* (2006.01)

(52) U.S. Cl.
CPC ...... *B23Q 17/22* (2013.01); *G05B 2219/37203* (2013.01); *G05B 2219/37221* (2013.01); *G05B 19/4086* (2013.01)
USPC ............... 700/176; 700/90; 700/95; 700/117; 700/159; 700/174; 700/175

(58) Field of Classification Search
USPC .............. 700/90, 95, 117, 159, 174, 175, 176
See application file for complete search history.

(56) References Cited

U.S. PATENT DOCUMENTS

| | | | | |
|---|---|---|---|---|
| 4,541,055 | A * | 9/1985 | Wolfe et al. | 700/166 |
| 4,819,339 | A * | 4/1989 | Kunzmann et al. | 33/503 |
| 2002/0077233 | A1* | 6/2002 | Oldani | 483/55 |
| 2003/0105603 | A1* | 6/2003 | Hardesty | 702/95 |

\* cited by examiner

*Primary Examiner* — Mohammad Ali
*Assistant Examiner* — Ziaul Karim
(74) *Attorney, Agent, or Firm* — Quinn Law Group, PLLC

(57) ABSTRACT

A method for properly locating a flexible fixture on a CNC machine comprises probing a plurality of locators on a flexible fixture to determine a locator position on a coordinate system for the CNC machine. The position for each of the plurality of locators is analyzed to determine if all of the plurality of locators are within a predetermined offset limit from a nominal position. A controller is programmed with an offset compensation amount based upon the probed position for each locator when each of the plurality of locators is within the predetermined offset limit. The locator positions are adjusted if one of the probed locations is not within the predetermined offset limit. The CNC probing programs are generated by a computer language to accommodate various fixture configurations.

13 Claims, 5 Drawing Sheets

US 8,761,920 B2

AUTOMATIC PROBING, COMPENSATION, AND ADJUSTMENT OF A FLEXIBLE FIXTURE FOR A CNC MACHINE

TECHNICAL FIELD

The present invention relates generally to properly locating flexible fixtures for CNC machines.

BACKGROUND

Computed numerically controlled (CNC) machines are frequently used to manufacture items that require machining processes to be used. In order to maximize CNC machining productivity, fixtures may be employed to align each part with the machine table. A fixture allows parts with different locating and clamping arrangements to be machined at the same machine table. When the fixture is installed on the table, it is possible that the fixture will not be perfectly aligned with the table, due to debris or other locating errors. To prevent the installation errors from compromising machined part quality, the flexible fixture must be aligned within a predetermined tolerance to the CNC machine. Several methods for minimizing the fixtures errors to the CNC machine are currently used. However, each method requires the effort of skilled maintenance personnel to perform precise calculations and complex procedures. Therefore, alignment of the flexible fixture using these methods requires several hours of machine downtime.

SUMMARY

A method for compensating a flexible fixture to a CNC machine comprises mounting a flexible fixture on a table for the CNC machine. A plurality of locators on the flexible fixture is probed to determine a locator position on a coordinate system for the CNC machine for each of the locators. The position for each of the plurality of locators is analyzed to determine if each of the plurality of locators is within a predetermined tolerance from a nominal position. When all of the plurality of locators are within the predetermined tolerance a set of offsets are calculated based upon the probed position for each locator, and the controller is programmed using these offsets to compensate the flexible fixture to obtain the correct the dimensions part when the part is machined.

A method for properly locating a flexible fixture to a CNC machine comprises probing a primary locator, a secondary locator and at least three tertiary locators on a flexible fixture mounted to the CNC machine to determine a locator position on a coordinate system for the CNC machine for each of the locators. The position of each of the primary locator, the secondary locator and the at least three tertiary locators is compared with a predetermined tolerance from a nominal position. A controller is programmed with calculated offset amounts based upon the probed position for each of the primary locator, the secondary locator and the at least three tertiary locators when all of the primary locator, the secondary locator and the at least three tertiary locators are within the predetermined tolerance. The position of at least one of the primary locator, the secondary locator and the at least three tertiary locators is adjusted to adjust a position of the flexible fixture when the probed position for any of the primary locator, the secondary locator and the at least three tertiary locators is not within the predetermined tolerance.

A method for generating a CNC machine program comprises inputting a nominal location for a primary locator, a secondary locator and at least three tertiary locators on a flexible fixture mounted to the CNC machine to determine a locator position on a coordinate system for the CNC machine for each of the locators. A nominal location is input for each of a plurality of spacers, where each of the plurality of spacers are associated with one of the primary locator, the secondary locator and the at least three tertiary locators. The CNC program is created based upon the nominal locations for the primary locator, the secondary locator, the at least three tertiary locators and the associated spacers.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
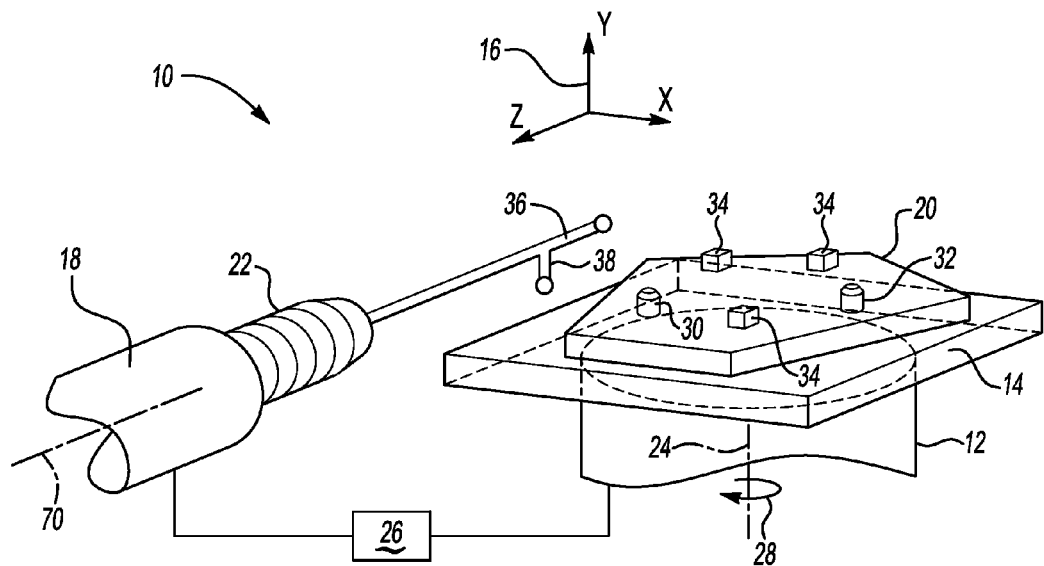
FIG. 1 is a partial schematic perspective view of a portion of a CNC machine having a probe and a first flexible fixture located on a table for the CNC machine.

Referring to the drawings, wherein like reference numbers refer to the same or similar components throughout the several views, FIG. 1 illustrates a partial view of a portion of a four-axis B rotary table CNC machine 10. The CNC machine 10 has a table 12. A base fixture 14 is mounted to the table 12 and a coordinate system 16 is associated with the table 12 and the base fixture 14. A probe 18 is operatively connected to the CNC machine 10 and has previously been calibrated to the CNC machine 10. The probe 18 includes a lateral stylus 38 and a straight stylus 36 for measuring point locations associated with the CNC machine 10.

The probe 18 and the table 12 are operatively connected to a controller 26 to provide input from the probe 18 and the table 12. The controller 26 also controls the CNC machine 10 including the rotational position of the table 12. In the embodiment shown, the CNC machine 10 rotates about the B-axis (shown at 24). The rotation of the CNC machine 10 is represented by arrow 28.

A flexible horizontal fixture 20 is mounted to the base fixture 14. The flexible fixture 20 is used to accommodate (and clamp) parts, with different support locations, that are to be mounted to the table 12 to be machined. The error of the flexible fixture 20 must be minimized relative to the table 12 for the CNC machine 10 prior to any parts being mounted to the flexible fixture 20. The probe 18 and table 12 for the CNC machine 10 has previously been calibrated. The base fixture 14 for the CNC machine 10 is configured to receive a horizontal flexible fixture 20. The flexible fixture 20 may be removed and replaced with another flexible fixture (not shown) to accommodate different parts. However, each flexible fixture 20 must be probed and the errors must be minimized every time the flexible fixture 20 is mounted on the CNC machine 10.

Figure 3:
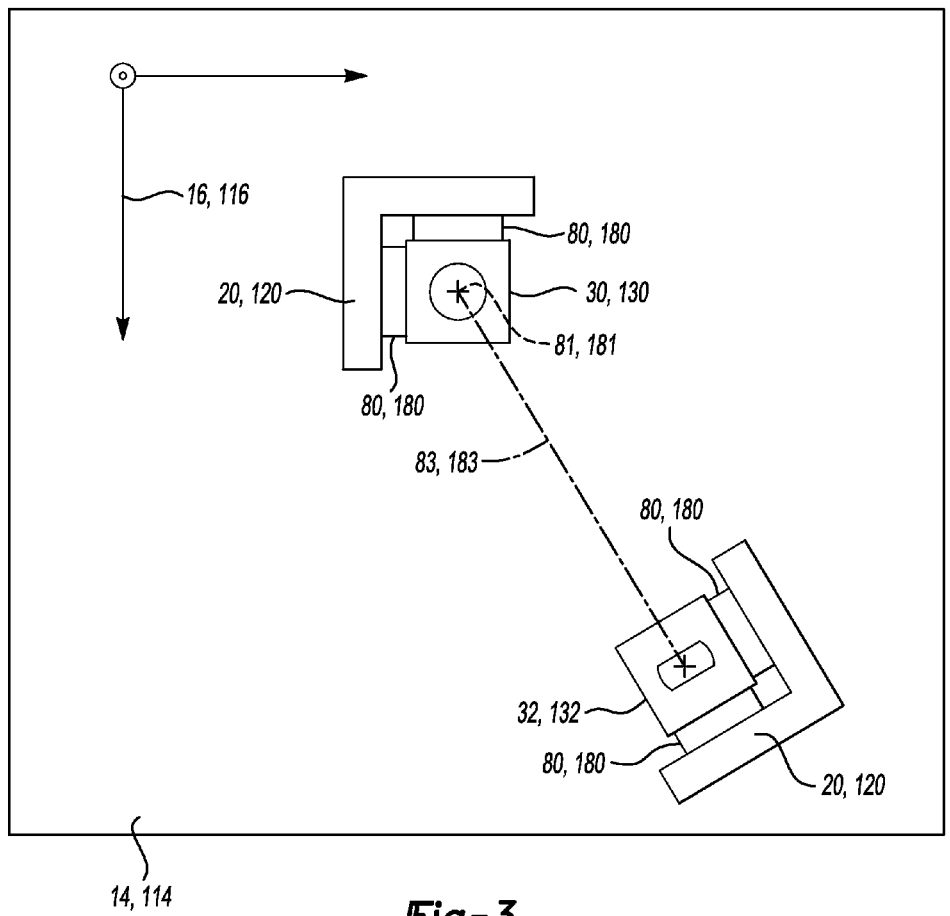
FIG. 3 is a partial schematic top view of a portion of a CNC machine illustrating an embodiment of adjusting locators of the flexible fixture to the CNC machines of FIGS. 1-2.
Figure 4:
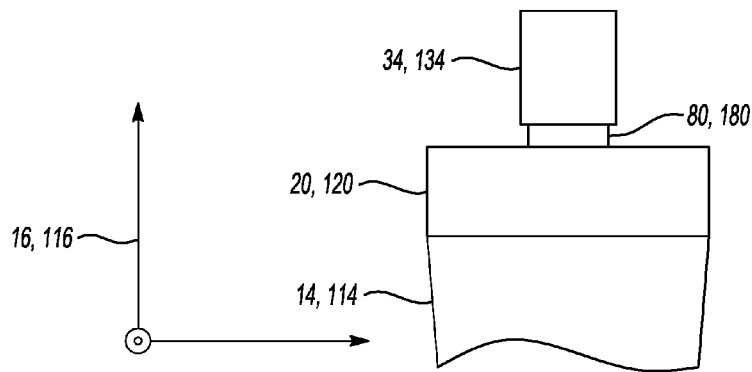
FIG. 4 is a partial schematic side view of a portion of a CNC machine illustrating an embodiment of further adjusting the locators to the CNC machines of FIGS. 1-3.

Referring to FIGS. 1 and 3-4, the flexible fixture 20 includes a plurality of locators that are used to support the parts on the flexible fixture 20. In the embodiment shown, there is at least one primary locator 30, a secondary locator 32 and three tertiary locators 34. When the flexible fixture 20 is mounted on the CNC machine 10 a nominal position for all of the locators 30-34 is input into the controller 26. Each of the locators 30-34 is probed to determine if the actual locator 30-34 is in the correct position. The parts are mounted to the flexible fixture 20 at the locators 30-34. Therefore, the position of the locators 30-34 is critical for properly locating the part (not shown) on the flexible fixture 20 to the CNC machine 10.

For a horizontal fixture the primary locator 30 and the secondary locator 32 are each measured in an XZ-position by the lateral stylus and the three tertiary locators 34 are measured by the straight stylus for a Y-position. The actual locator 30-34 positions are compared to the nominal positions to determine whether they are within the allowable tolerance.

In addition to the position of the locators 30-34 being properly measured, the flexible fixture 20 may be tilted in any of the planes. The amount of tilt, or normal vector, for each of the planes (XY, XZ, YZ), is calculated as part of properly probing the flexible fixture 20 with respect to the CNC machine 10. The position of the locators 34 relative to one another is used to calculate a normal vector for the flexible fixture 20 for the desired planes of the coordinate system 16.

Figure 5:
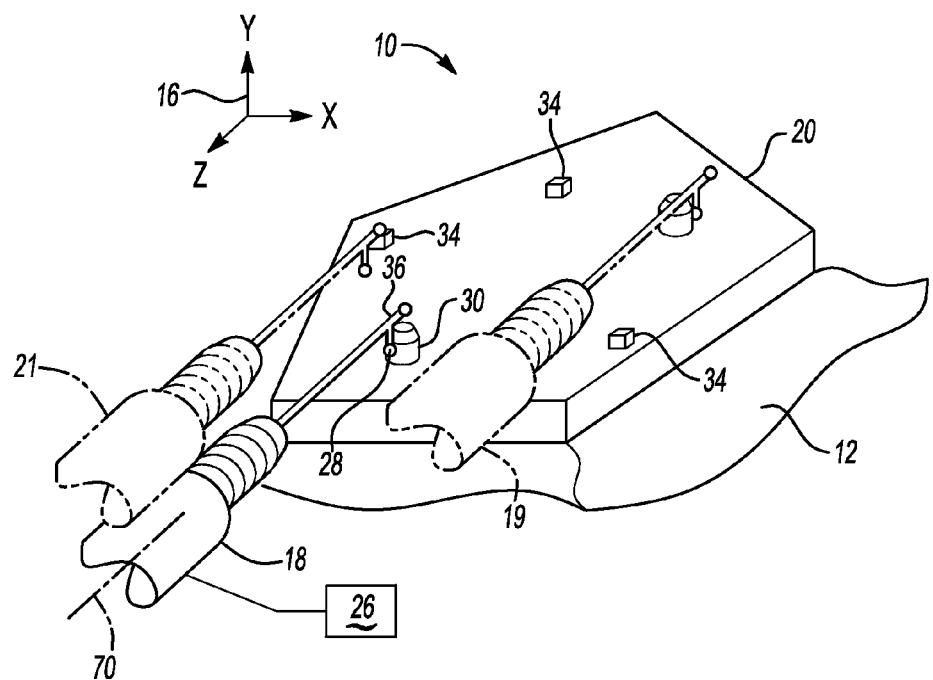
FIG. 5 is a partial schematic perspective view of a portion of a CNC machine illustrating a first embodiment of probing a horizontal fixture for use with the CNC machine of FIG. 1.

FIG. 5 illustrates how the previously calibrated probe 18 may be used to measure the position of the locators 30-34 for the horizontal flexible fixture 20. Specifically, the X-positions of the primary and secondary pins (or dowels) 30 and 32 for the horizontal fixture 20 are probed by lateral stylus 38 in the X-direction. The Y-positions of the tertiary pads 34 for the horizontal fixture 20 are probed by straight stylus 36 in the Y-direction. The Z-positions of the primary pins 30 and secondary pins 32 for the horizontal fixture 20 are probed by lateral stylus 38 in the Z-direction. The primary pins 30 and the secondary pins 32 are probed on the left and right sides (as shown in FIG. 5) in the X-direction and averaged to get the X-center position for each pin 30 and 32. The primary 30 and secondary 32 pins are probed on the front and rear (as shown in FIG. 5) in the Z-direction and averaged to get the Z-center position for each pin 30 and 32.

Figure 6:
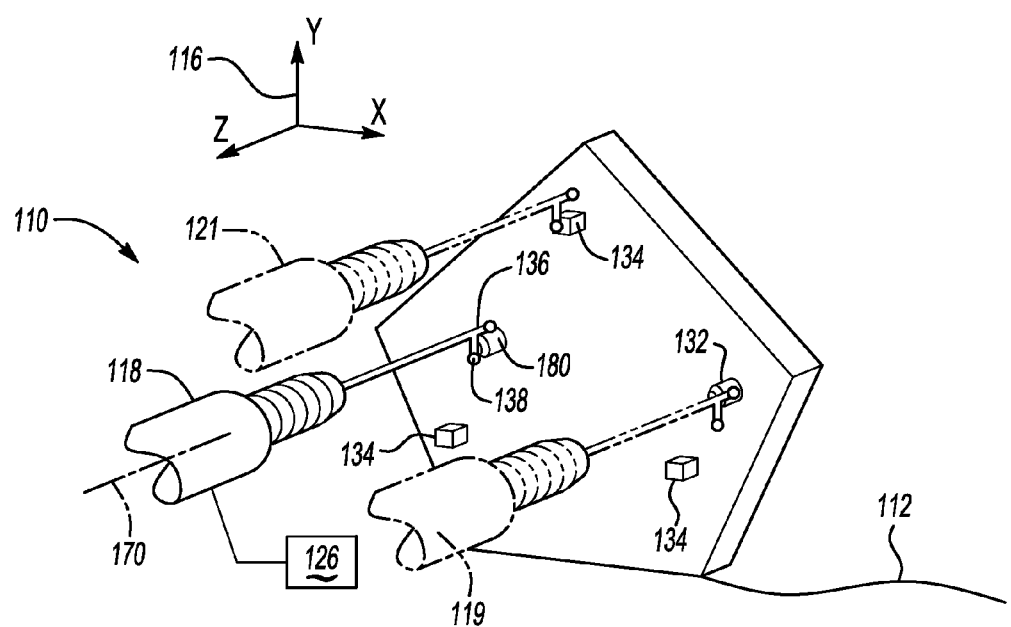
FIG. 6 is a partial schematic perspective view of a portion of a CNC machine further illustrating the first embodiment of probing a vertical fixture for use with the CNC machine of FIG. 2.
Figure 7:
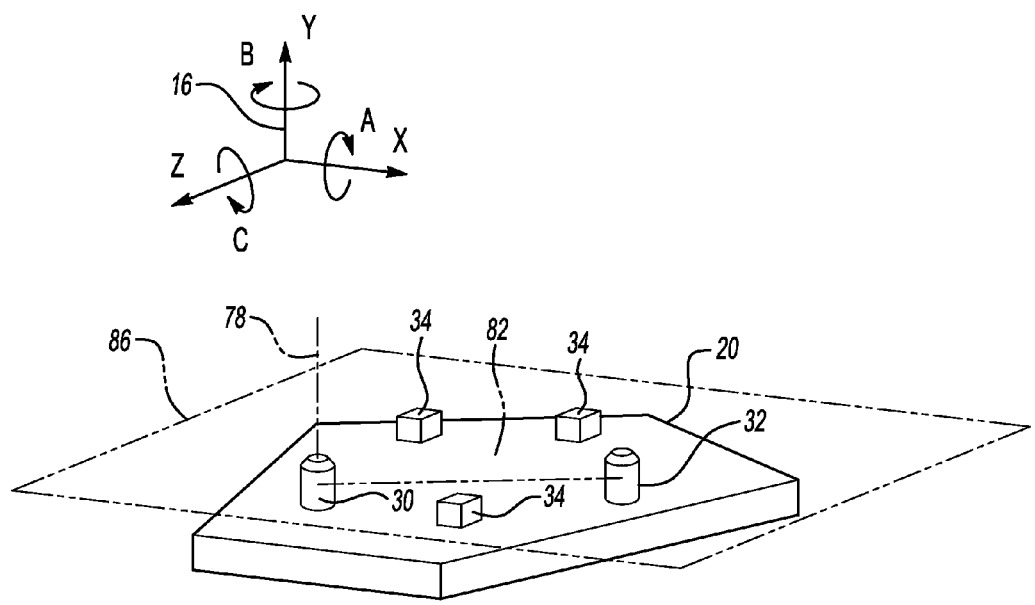
FIG. 7 is a partial schematic top view of a portion of a CNC machine illustrating an embodiment of measuring the position of the locators of the horizontal fixture for use with the CNC machine of FIGS. 1 and 5.

Referring to FIGS. 5-7, the horizontal flexible fixture 20 is probed and measured. The XZ-position of the primary pin 30, the XZ-position of the secondary pin 32, and the Y-position of the at least three tertiary pads 34 are obtained from the measurements. If all of the errors of the measured positions versus the nominal positions are within the predetermined tolerance, the errors are compensated electronically by the controller 26. The compensation eliminates the errors electronically so the fixture 20 itself does not need to be manually adjusted. The 4-axis B machine 10 (including the rotary table 12) is capable of compensating the XYZ-axes of the coordinate system as well as and B-axis 24 (shown in FIG. 7) as explained in greater detail below. A fixture 20 center is the actual center of the fixture 20. The XZ-position of the primary pin 30 is defined as the fixture center in XZ-directions. A line 78 is constructed perpendicular to the XZ-plane and passing through the XZ-position of the primary pin 30. A $X_1Z_1$-plane 86 is constructed based on the measured Y-positions of the three tertiary pads 34. The interception of the $X_1Z_1$-plane 86 to the line 78 provides a fixture center $P_1$ (not labeled) for the fixture 20. Therefore, the actual fixture center is calculated based on the probing results. The controller 26 compensates the nominal position of the fixture center on the coordinate system 16 to the actual fixture center by translating the XYZ and B-axes.

Further, a second line 82 is constructed that passes through the measured XZ-position of the primary pin 30 and the measured XZ-position of the secondary pin 32 (illustrated in FIG. 7). The orientation of the line 82 in the XZ-plane may not coincide with the nominal orientation in the XZ-plane. Line 82 defines the orientation of the line 82 with respect to XYZ coordinate system 16, and the distance between the primary pin 30 and the secondary pin 32. Both of these parameters are used by the controller 26 to determine the errors and proper adjustment or compensation. The controller 26 compensates the nominal orientation of the fixture center to the actual orientation of the fixture center by translating the B-axis 28. The predetermined tolerance can be specified to a wide range because the B errors of position the flexible fixture 20 on the machine table 12 can be compensated using the above procedure. This provides several benefits to the fixture 20 alignment procedure, including reducing the time required to align the fixture 20 to the machine 10. The plane constructed by the three tertiary pads 34 produce a compound angle along machine A and C rotational directions. These angle errors in A and C directions cannot be compensated by the 4-axis B machine 10 electronically. Tight predetermined tolerances are specified to them based on the part tolerances.

As mentioned above, adjusting the position of the locators 30-34 aligns the flexible fixture 20 to the CNC machine 10. The locators 30-34 are attached to the flexible fixture 20 with spacers 80. If the locations of any of the locators 30-34 are out of tolerance, that locator 30-34 position can be adjusted by changing the width of the spacers 80. The primary locator 30 and the secondary locator 32 each have two spacers 80, which allow the locators 30, 32 to be adjusted relative to two of the directions. The tertiary locators 34 have one spacer 80 each, allowing the tertiary locators 34 to be adjusted relative to one direction. For a horizontal fixture on a B-axis CNC machine 10 the primary locator 30 and the secondary locator 32 each provide an XZ-position. That is, the primary locator 30 and the secondary locator 32 are measured for X and Z-positions. The spacers 80 associated with the primary locator 30 and the secondary locator 32 for horizontal flexible fixtures 20 may or may not require adjustment in X and Z directions. In either case, the controller 26 will determine the adjustment for each spacer 80. Therefore, the adjustments determined by probing are projected to the spacers 80 directions, as described-below to align the locators 30 and 32 on the flexible fixture 20. The tertiary locators 34 each have a y-position. That is, the Y location for each of the tertiary locators 34 is measured. Therefore, the spacer 80 associated with the respective tertiary locator 34 may be adjusted relative to the Y-axis to align the flexible fixture 20. The amount of adjustment required for each of the locators 34 is determined by the probing procedure and the controller 26. The flexible fixture 20 may be out of location for a number of reasons, including misalignment during installation, interference from debris, minor machining accidents, wear of the locators 30-34 or of the spacers 80. In any case, the controller 26 is programmed to automatically estimate the adjustments for each of the locators based on the measurement of the above probing process and the specified tolerances.

Figure 2:
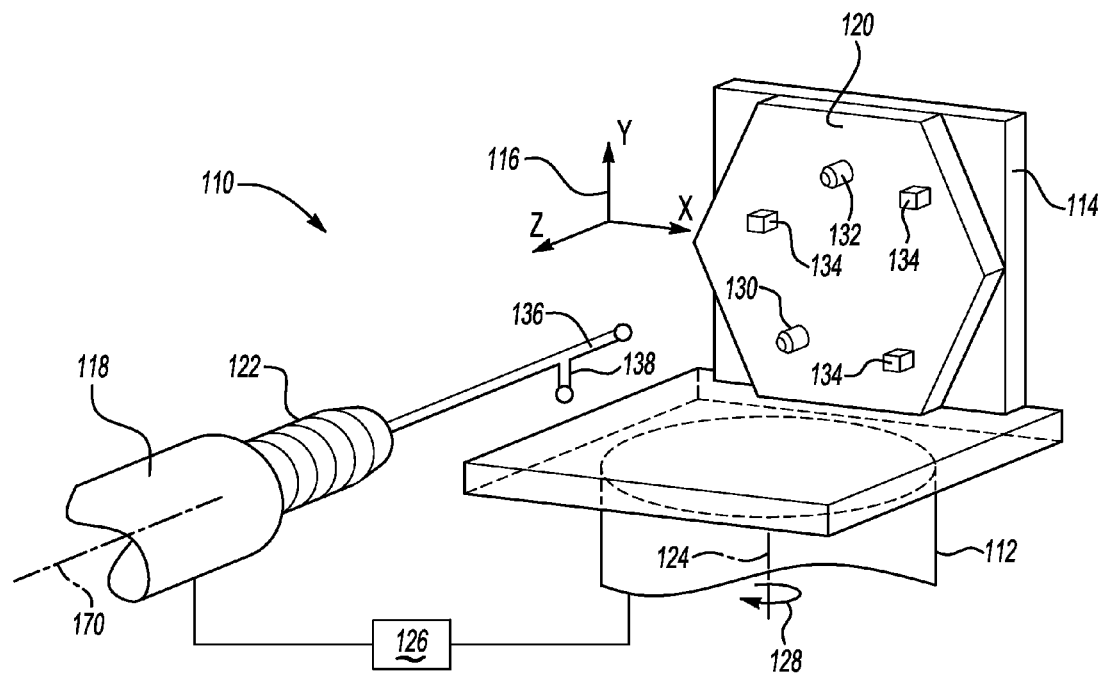
FIG. 2 is a partial schematic perspective view of a portion of a second CNC machine having a probe and a second flexible fixture located on a table for the CNC machine.

FIG. 2 illustrates a partial view of a portion of a flexible vertical fixture 120 mounted on a four-axis B rotary table CNC machine 110. The CNC machine 110 has a table 112. A base fixture 114 is mounted to the table 112 and a coordinate system 116 is associated with the table 112 and base fixture 114. A probe 118 is operatively connected to the CNC machine 110 and has previously been calibrated to the CNC machine 110. The probe 118 is mounted including a lateral stylus 138 and a straight stylus 136 for measuring point locations associated with the CNC machine 110.

The probe 118 and the table 112 are operatively connected to a controller 126 to provide input from the probe 118 and the table 112. The controller 126 also controls the CNC machine 110 including the rotational position of the table 112. In the embodiment shown, the CNC machine 110 rotates about the B-axis (shown at 124). The rotation of the CNC machine 110 is represented by arrow 128.

A flexible vertical fixture 120 is mounted to the base fixture 114. The flexible fixture 120 is used to clamp parts, with different support locations, that are to be mounted to the CNC machine 110 to be machined. The error of the flexible fixture must be minimized with respect to the table 112 for the CNC machine 110 prior to any parts being mounted to the flexible fixture 120. The probe 118 and table 112 for the CNC machine 110 has previously been calibrated. The base fixture 114 for the CNC machine 110 is configured to receive a vertical flexible fixture 120. The flexible fixture 120 may be removed and replaced with another flexible fixture (not shown) to accommodate different parts. However, each flexible fixture 120 must be probed and the errors must be minimized every time the flexible fixture 120 is mounted on the CNC machine 110.

Referring to FIGS. 2-4, the flexible fixture 120 includes a plurality of locators that are used to support the parts on the flexible fixture 120. In the embodiment shown, there is at least one primary locator 130, a secondary locator 132 and three tertiary locators 134. When the flexible fixture 120 is mounted on the CNC machine 110 a nominal position for all of the locators 130-134 is input into the controller 126. Each of the locators 130-134 is probed to determine if the actual locator 130-134 is in the correct position and whether their relative position is with a predetermined tolerance. The parts are mounted to the flexible fixture 120 at the locators 130-134. Therefore, the relative position of the locators 130-134 is critical for properly positioning the flexible fixture 120 to the CNC machine 110.

Referring to FIG. 6, a vertical fixture the primary locator 130 and the secondary locator 132 are each measured in an X-position by the calibrated straight stylus 136, in the Y-position by the calibrated straight stylus 136, and the three tertiary locators 134 are measured for Z-positions by the calibrated lateral stylus 138. The actual positions of the locators 130-134 are compared to the nominal positions to determine whether they are within the predetermined tolerance for each locator 130-134.

In addition to the position of the locators 130-134 being not properly located, the flexible fixture 120 may be tilted in any of the planes (XY, XZ, YZ). The amount of tilt, or normal vector, for each of the planes is calculated as part of probing the flexible fixture 120 to the CNC machine 110. The position of the locators 130-134 relative to one another is used to calculate a normal vector for the flexible fixture 120 for the desired planes of the coordinate system 116.

As mentioned above, adjusting the position of the locators properly locates the flexible fixture 120 on the CNC machine 110. The locators 130-134 are attached to the flexible fixture 120 with spacers 180. If the locations of any of the locators 130-134 are out of tolerance, the locator 130-134 position can be adjusted by changing the width of the spacers 180. The primary locator 130 and the secondary locator 132 each have two spacers 180, which allow the locators 130, 132 to be adjusted along in two of the directions. The spacers 180 of one of the locators 130 or 132 may be adjusted so that the distance between the locators 130 and 132 is within the allowable tolerance. The amount of adjustment required will be calculated based on the probing results. The spacers 180 for both locators 130 and 132 may require adjustment if the tilt of the C rotary direction (illustrated in FIG. 8) is out of tolerance on calculations using the probing information. The tertiary locators 134 have one spacer 180 each, allowing the tertiary locators 134 to be adjusted in one direction. For a vertical fixture 120 the primary locator 130 and the secondary locator 132 each provide a xy-position. That is, the primary locator 130 and the secondary locator 132 are measured for X and Y-positions. The spacers 180 associated with the primary locator 130 and the secondary locator 132 for vertical flexible fixtures 120 may or may not be adjusted to minimize the errors in the X and Y-directions. Therefore, the adjustments are calculated for the directions in which each of the spacers 180 may be adjusted to align the flexible fixture 120. The tertiary locator 134 has a Z-position. That is, the Z-location of the tertiary locator 134 is measured. Therefore, the spacer 180 associated with the tertiary locator 134 may be adjusted along the Z-axis, as described below, to align the flexible fixture 120. The flexible fixture 120 may be out of location for a number of reasons, including misalignment during installation, interference from debris, wear of the locators 130-134 or of the spacers 180.

Figure 8:
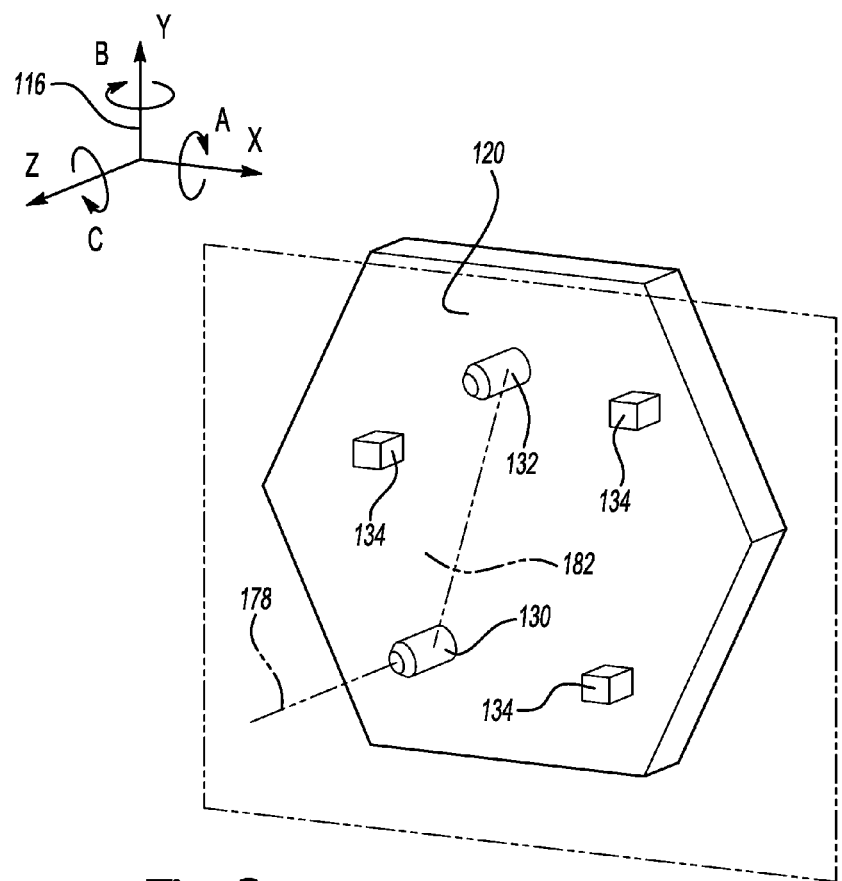
FIG. 8 is a partial schematic side view of a portion of a CNC machine illustrating an embodiment of measuring the position of the locators of the vertical fixture for use with the CNC machine of FIGS. 2 and 6.

FIGS. 6 and 8 illustrate a method for probing the locators 130-134 of a flexible fixture 120 using the probe 118. The probe 118 includes a straight stylus 136 and a lateral stylus 138. The probe 118 may be rotated about a spindle axis 170 defined. The straight stylus 136 and a lateral stylus 138 of probe 118 are calibrated to the CNC machine 110 prior to probing the flexible fixture 120.

The previously calibrated probe 118 may be used to measure the position of the locators 130-134 for the flexible fixtures 120. Specifically, the X-positions of the primary pin 130 and the secondary pin 132 for the vertical fixture 120 are probed by straight stylus 136 in X-direction. The Y-positions of the primary pin 130 and the secondary pins 132 for the vertical fixture 120 are probed by straight stylus 136 in the Y-direction. The Z-positions of the tertiary pads 134 for the vertical fixture 120 are probed by lateral stylus 138 in the Z-direction. The primary 130 and secondary 132 pins are probed in the X-directions and averaged to get the X-center position for each. The primary pin 130 and the secondary pin 132 are probed in Y-directions and averaged to get the Y-center positions for each. The X and Y-center positions are used to calculate the distance between the locators 130 and 132 and the corresponding orientation of the line through the centers.

The vertical flexible fixture 120 is probed and the measured XY-position of the primary pin 130, the XY-position of the secondary pin 132, and the Z-positions of the at least three tertiary pads 134 are obtained. If all of the errors of the measured positions versus the nominal positions are within the predetermined tolerance, the errors are compensated electronically by the controller 126. The compensation eliminates the errors electronically so the fixture 120 itself does not need to be manually adjusted. The 4-axis B machine is capable of compensating the XYZ and B-axes (shown in FIG. 8). A fixture center is the actual center of the fixture. The XY-position of the primary pin 130 is defined as the fixture center in the XY-directions. A line 178 is constructed perpendicular to the XY-plane and passing through the XY-position of the primary pin 130. A $X_{11}Y_{11}$ plane 186 is constructed based on the three measured Z-positions on the tertiary pads 134. The intersection of the $X_{11}Y_{11}$ plane 186 to the line 178 provides the fixture center $P_{11}$ for the fixture 120. Therefore, the actual center of the fixture 120 is calculated based on the probing results. The controller 126 compensates the actual center of the fixture 120 to the nominal fixture center in the XYZ and B-axes.

Further, a line 182 may be constructed that passes through the measured XY-position of the primary pin 130 and the measured XY-position of the secondary pin 132 (illustrated in FIG. 8). The orientation of the line 182 in the XY-plane may not coincide with the nominal orientation in the XY-plane. Line 182 defines the orientation of the line 182 with respect to XYZ coordinate system 116, and the distance between the primary pin 130 and the secondary pin 132. Both of these parameters are used by the controller 126 to determine the errors and proper adjustment or compensation. However, the controller 126 can not compensate for the orientation error, which is in the C rotary direction, to the nominal line orientation for a B-axis machine. Therefore, a tight tolerance is predetermined for the C error. A manual adjustment may be performed if the error exceeds the tolerance. Additionally, the $X_{11}Y_{11}$ plane 186 constructed by the three tertiary pads produce a compound angle along the A rotary direction and the machine B-axes. This angle error in the A direction cannot be compensated by the 4-axis B machine. Again, a tight predetermined tolerance is specified for the A-direction. However, the angle error in B-axis can be compensated by the 4-axis B machine. Therefore, a large predetermined tolerance is specified for the B-axis, which benefits the fixture 120 alignment procedures.

Figure 9:
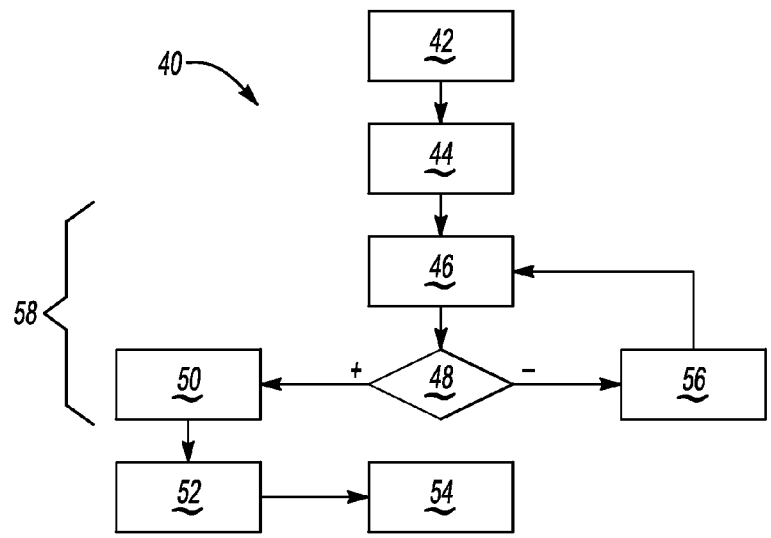
FIG. 9 is a schematic flow chart illustration of a first method of probing, compensating and aligning a flexible fixture to the CNC machines of FIGS. 1 and 2.

FIG. 9 illustrates a method of properly locating the first and second flexible fixtures 20, 120 to the respective CNC machine 10, 110 of FIGS. 1 and 2. Properly locating the flexible fixture 20, 120 to the CNC machine 10, 110 includes probing, compensating, and adjusting the flexible fixture 20, 120 to the CNC machine 10, 110. The same method, illustrated at 40, is used whether the fixture 20, 120 is a horizontal fixture or a vertical fixture. The probe 18, 118 is already calibrated to the table 12, 112 and the coordinate system 16, 116, illustrated at step 42. The flexible fixture 20, 120 is mounted on the base fixture 14, 114, step 44. Mounting the flexible fixture 20, 120 to the base fixture 14, 114 includes inputting a nominal position for each of the locators 30-34, 130-134. The probe 18, 118 measures the locators, 30-34, 130-134 on the flexible fixtures 20, 120 to determine the actual locator position, step 46. The controller 26, 126 determines whether the measured locators 30-34, 130-134 are within a predetermined tolerance amount from a nominal position, step 48. If the locators 30-34, 130,134 are within the predetermined tolerance amount (indicated by a + in FIG. 7) then the CNC machine 10, 110 is compensated a calculated offset amount based upon the measured locations of the locators 30-34, 130-134, step 50. That is, the coordinate system 16, 116 for the CNC machine 10 is translated on the appropriate axes to compensate the coordinate system 16, 116 to the flexible fixture 20, 120. After the CNC machine 10 has been compensated the offset of the flexible fixtures, 20, 120 then the CNC machine 10 can be used to begin machining parts (not shown), step 52. After several parts (not shown) have been machined using the CNC machine 10 then the parts can be measured with a coordinate measuring machine (CMM) to confirm they have been accurately machined, step 54.

If the locator positions of the flexible fixtures 20, 120 are not within the predetermined tolerance (indicated by a dashed line (−) in FIG. 7) than the flexible fixtures 20, 120 may be repositioned on the base fixture 14, 114, step 56. The controller 26, 126 calculates an adjustment amount for the particular spacers 80, 180 and/or locators 30-34, 130-134, step 56. The adjustment amount includes the direction and distance each locator 30-34, 130-134 must move to be at the respective nominal position. The necessary adjustments may be made manually prior to measuring the positions of the locators 30-34, 13-134 again. Repositioning the flexible fixture 20, 120 may involve using shims and/or grinding the locators 30-34, 130-134 by adjusting the indicated amount for that particular spacer 80, 180, step 56. The adjustment amount includes the direction and distance each locator 30-34, 130-134 must move to be at the respective nominal position. The necessary adjustments may be made manually prior to measuring the positions of the locators 30-34, 130-134 again. After the flexible fixture, 20, 120 has been repositioned the CNC machine again measures the locators, 30-34, 130-134 on the flexible fixtures 20, 120, step 46. This process may be repeated until the flexible fixture 20 is within the predetermined tolerance amount. Thereafter, the co-ordinate system 16, 116 for the CNC machine 10, 110 may be compensated to accommodate the offset, step 50.

For each base fixture 14, 114 there may be a multiple flexible fixtures 20, 120 available for mounting parts to the CNC machine 10, 110. The nominal positions of the locators 30-34, 130-134 are different from one flexible fixture 20, 120 to another. The method of properly locating the flexible fixtures 20, 120 on the CNC machine 10, 110 accommodates different nominal locations of the locators 30-34, 130-134 for each of the flexible fixtures 20, 120. The controller 26, 126 is used to provide the necessary adjustments through step 50 for the individual fixtures 20, 120 so that the parts machined using the various fixtures 20, 120 are within a specified tolerance.

This process (illustrated by step 56 and step 50) to adjust the fixture 20,120 to a CNC machine 10, 110 eliminates the trial-and-error approach for minimizing the fixture 20, 120 errors during the fixture 20, 120 setup procedure in the CNC machine 10, 110. Repositioning the flexible fixture 20, 120, step 56, is used during the initial adjustment of the fixture 20, 120 in the CNC machine 110 to avoid the long trial-and-error method of manual adjustments. Repositioning the flexible fixture 20, 120, step 56 will minimize the major errors of the fixture 20, 120 below a predetermined tolerance amount from the nominal position. The errors of the fixture 20, 120 may result because the manufacturing of the individual components including the locators 30, 32, 34, 130, 132, and 134 or spacers 80,180 have dimensional variations as they are constructed by a machining process. Therefore, calculating the offset amount based upon the measured locations of the locators 30-34, 130-134, step 50, is necessary and may be used to minimize the smaller fixture errors that could not be adjusted when reposition the flexible fixture, step 56. When both the repositioning and the compensating of the flexible fixture 20, 120, steps 56 and 50, are completed the fixture 20, 120 errors are minimized to be within the uncertainty of the probe 18, 118 and the CNC machine 10, 110 axes, i.e. within the repeatability of the probe and machine axes. Hence, all the same parts machined on different fixtures 20, 120 will have very small variation. Likewise, every part machined in a fixture 20, 120 using the step 56 and step 50 will be within narrow quality control tolerances.

Therefore, referring to FIGS. 1, 2 and 9 the method 40 for properly locating a flexible fixture 20, 120 to a CNC machine 10, 110 includes mounting the flexible fixture 20, 120 to the CNC machine 10, 110. A primary locator 30, 130, a secondary locator 32, 132 and at least three tertiary locators 34, 134 on the flexible fixture 20, 120 are probed to determine the respective positions on a coordinate system 16, 116 for the CNC machine 10, 110, step 46. The position of each of the primary locator 30, 130, the secondary locator 32, 132 and the at least three tertiary locators 34, 134 are compared with a predetermined tolerance amount from the nominal position, step 48. The controller 26, 126 calculates an offset amount and compensates the CNC machine 10, 110, based upon the probed position for each of the primary locator 30, 130, the secondary locator 32, 132 and the at least three tertiary locators 34, 134 when all of the locators 30-34, 130-134 are within the predetermined tolerance amount, step 50. The position of at least one of the primary locator 30, 130, the secondary locator 32, 132 and the at least three tertiary locators 34, 134 is adjusted to adjust a position of the flexible fixture 20, 120 when the probed position for any of the primary locator 30, 130, the secondary locator 32, 132 and the at least three tertiary locators 34, 134 is not within the predetermined tolerance amount, step 56.

Figure 10:
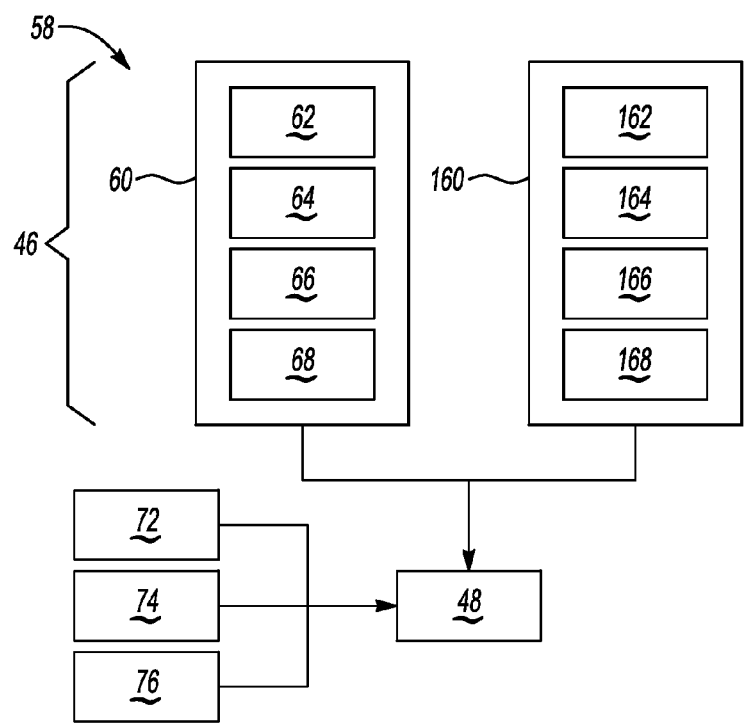
FIG. 10 is a schematic flow chart illustration of a first method of generating a CNC machine program for the flexible fixture to the CNC machines of FIGS. 1-2.

Referring to FIG. 10, a method of generating the CNC program for probing the flexible fixtures is shown at 58. The method for inputting the information of locators 30-34, 130-134 is illustrated at 46 in greater detail. A method for inputting the information of the horizontal fixture is illustrated at 60 and the method for inputting the information of the vertical fixture is illustrated at 160. First, the nominal locations of the primary locator 30 is input for the horizontal fixture 20, at step 62, and/or the nominal locations of the primary locator 130 is input for the vertical fixture 120, at step 162. For the horizontal fixture 20 the primary locator 30 corresponds to a XZ-position for the primary locator 30. For the vertical fixture 120, the primary locator 130 corresponds to a XY-position for the primary locator 130. Following this, the secondary locator 32 for the horizontal fixture 20 is input, at step 64, and/or the secondary locator 132 for the vertical fixture 120 is input, at step 164. For the horizontal fixture 20 the secondary locator 32 corresponds to a XZ-position for the secondary locator 32. For the vertical fixture 120, the secondary locator 132 corresponds to a XY-position for the secondary locator 132. Then the nominal locations of the tertiary locators 34 for the horizontal fixture 20 are input, at step 66, and/or the tertiary locators 134 for the vertical fixture 120 are input at step 166. The tertiary locators 34 for the horizontal fixture 20 are y-pad locators and the tertiary locators 134 for the vertical fixture 120 are z-pad locators.

Referring to FIGS. 3-4 and 10, the locators 30-34, 130-134 are mounted to the flexible fixture 20,120 using the spacers 80, 180. The nominal locations and normal vectors of the spacer 80, 180 are input, at step 68, 168.

FIG. 10 illustrates inputting the information for the locators 30-34, 130-134 and the spacer 80,180, step 46. A computer language generates CNC probing programs, at step 48, based on the inputted information of locators and spacers. The computer language 48 uses the table 12, 112 and fixture 14, 114 position information, represented at 72, information regarding probe calibration, represented at 74, and probe length and height information, represented at 76 to generate CNC probing programs for various fixture type and various locator formations, at step 56.

Although a 4-axis B rotary CNC machine 10 is utilized in the embodiments described, any CNC machine 10, 110 may benefit from properly locating a flexible fixture 20, 120 to the CNC machine 10, 110 using the methods as described herein. Properly locating a flexible fixture 20, 120 to the CNC machine 10, 110 includes probing, compensating, and adjusting the flexible fixture 20, 120 to the CNC machine 10, 110.

Although the technique described above is illustrated for a quick fixture change, the procedure is applicable for any fixture alignment and compensation that is desired. The technique is applicable to dedicated fixtures, fixable fixture changes, fixtures with configurable locator positions, and fixtures with locator formations other than pin-pad locating.

While the best modes for carrying out the invention have been described in detail, those familiar with the art to which this invention relates will recognize various alternative designs and embodiments for practicing the invention within the scope of the appended claims.

The invention claimed is:

1. A method for properly locating a flexible fixture to a CNC machine comprising: mounting a flexible fixture on a table of the CNC machine; probing a plurality of locators on the flexible fixture to determine a locator position on a coordinate system for the CNC machine for each of the locators;
   determining if each of the plurality of locators is within a predetermined offset limit from a nominal position;
   programming a controller with an offset compensation amount based upon the determined locator position for each locator when all of the plurality of locators are within the predetermined offset limit;
   adjusting the position of at least one of the plurality of locators to adjust a position of the flexible fixture when the determined locator position for any of the plurality of locators is not within the predetermined offset limit; and
   wherein adjusting the position of at least one of the plurality of locators further comprises one of shimming the at least one of the plurality of locators, grinding the at least one of the plurality of locators and adjusting a spacer associated with the at least one of the plurality of locators.

2. The method of claim 1, wherein adjusting at least one of the plurality of locators to adjust a position of the flexible fixture further comprises calculating an amount that the at least one of the plurality of locators must be adjusted in each direction with the controller, based upon the determined locator position for the at least one of the plurality of locators.

3. The method of claim 1, wherein adjusting at least one of the plurality of spacers to adjust a position of the flexible fixture further comprises adjusting a spacer to reposition one of: a primary locator relative to one of a first and second axes, a secondary locator relative to one of a first and second axes, and a tertiary locator relative to a third axes of the coordinate system.

4. The method of claim 1, wherein probing a plurality of locators on the flexible fixture to determine a locator position for each of the locators further comprises using the determined locator positions to determine a normal vector for a plane passing through three tertiary locators disposed on the flexible fixture.

5. The method of claim 1, wherein probing a plurality of locators on the flexible fixture to determine a locator position for each of the locators further comprises measuring at least a primary locator, a secondary locator and three tertiary locators.

6. The method of claim 5, wherein probing the primary and the secondary locators provides a xz-position for the primary and secondary locators when the flexible fixture is a horizontally mounted fixture, and probing the tertiary locators provides a y-position for each tertiary locator when the flexible fixture is a horizontally mounted fixture.

7. The method of claim 5, wherein probing the primary and the secondary locators provides a xy-position for the primary and secondary locators when the flexible fixture is a vertically mounted fixture, and probing the tertiary locators provides z-positions for each tertiary locator when the flexible fixture is a vertically mounted fixture.

8. A method for properly locating a flexible fixture to a CNC machine comprising:
    probing a primary locator, a secondary locator and at least three tertiary locators on a flexible fixture mounted to the CNC machine to determine a locator position on a coordinate system for the CNC machine for each of the locators;
    determining if each of the primary locator, the secondary locator and the at least three tertiary locators is within a predetermined offset limit from a nominal position;
    programming a controller with an offset compensation amount based upon the probed position for each of the primary locator, the secondary locator and the at least three tertiary locators when all of the primary locator, the secondary locator and the at least three tertiary locators are within the predetermined offset limit; and
    adjusting the position of at least one of the primary locator, the secondary locator and the at least three tertiary locators to adjust a position of the flexible fixture when the determined locator position for any of the primary locator, the secondary locator and the at least three tertiary locators is not within the predetermined offset limit,
    wherein adjusting the position of at least one of the primary locator, the secondary locator and the at least three tertiary locators further comprises one of shimming, grinding, and adjusting a spacer.

9. The method of claim 8, wherein adjusting at least one of the plurality of spacers to adjust a position of the flexible fixture further comprises adjusting the spacer to move one of: the primary locator relative to one of a first and second axes, the secondary locator relative to one of a first and second axes, and any of the at least three tertiary locators relative to a third axes of the coordinate system.

10. The method of claim 8, wherein adjusting at least one of the plurality of locators to adjust a position of the flexible fixture further comprises calculating an amount that the at least one of the plurality of locators must be adjusted in each direction with the controller, based upon the determined locator position for the respective one of the plurality of locators.

11. The method of claim 8, wherein probing a plurality of locators on the flexible fixture to determine a locator position for each of the locators further comprises using the determined locator positions to determine a normal vector for a plane passing through the at least three tertiary locators.

12. The method of claim 8, wherein probing the primary and the secondary locators provides a XZ-position for the primary and secondary locators when the flexible fixture is a horizontally mounted fixture, and probing the at least three tertiary locators provides a y-position for each of the at least three tertiary locators when the flexible fixture is a horizontally mounted fixture.

13. The method of claim 8, wherein probing the primary and the secondary locators provides a XY-position for the primary and secondary locators when the flexible fixture is a vertically mounted fixture, and probing the at least three tertiary locators provides a z-position for each of the at least three tertiary locators when the flexible fixture is a vertically mounted fixture.

* * * * *